(12) United States Patent
Haste, III

(10) Patent No.: US 6,665,389 B1
(45) Date of Patent: Dec. 16, 2003

(54) ANONYMOUS INTERACTIVE INTERNET-BASED DATING SERVICE

(76) Inventor: Thomas E. Haste, III, 11288 Ventura Blvd., Suite 734, Studio City, CA (US) 91604

( * ) Notice: Subject to any disclaimer, the term of this patent is extended or adjusted under 35 U.S.C. 154(b) by 486 days.

(21) Appl. No.: 09/626,776

(22) Filed: Jul. 27, 2000

Related U.S. Application Data

(60) Provisional application No. 60/169,965, filed on Dec. 9, 1999.

(51) Int. Cl.[7] ............................ H04L 12/16; H04L 12/28
(52) U.S. Cl. ........................ 379/196; 370/259; 370/389; 379/201.11; 379/210.03; 379/900; 379/913
(58) Field of Search ................................ 370/259, 389, 370/392; 379/188, 196, 197, 198, 199, 200, 201.01, 201.02, 201.11, 210.02, 210.03, 900, 913

(56) References Cited

U.S. PATENT DOCUMENTS

| | | | |
|---|---|---|---|
| 4,847,890 A | 7/1989 | Solomon et al. | 379/88.21 |
| 4,878,239 A | 10/1989 | Solomon et al. | 379/88.23 |
| 5,058,152 A | 10/1991 | Solomon et al. | 379/67.1 |
| 5,361,295 A | 11/1994 | Solomon et al. | 379/67.1 |
| 5,509,064 A * | 4/1996 | Welner et al. | 379/265.02 |
| 5,623,536 A | 4/1997 | Solomon et al. | 379/88.18 |
| 5,768,348 A | 6/1998 | Solomon et al. | 379/67.1 |
| 5,809,114 A * | 9/1998 | Solomon et al. | 379/88.19 |
| 5,818,836 A | 10/1998 | DuVal | 370/389 |
| 5,907,677 A * | 5/1999 | Glenn et al. | 709/206 |
| 6,148,067 A * | 11/2000 | Leipow | 379/201.01 |
| 6,504,920 B1 * | 1/2003 | Okon et al. | 379/121.01 |

* cited by examiner

Primary Examiner—Harry S. Hong
(74) Attorney, Agent, or Firm—Blakely, Sokoloff, Taylor & Zafman

(57) ABSTRACT

An interactive Internet-based dating service allows people to anonymously interact via Internet browsers, telephone communications and/or video conferencing. The system employs an interactive web site allowing a person to seek another person who may be compatible for a relationship. The system gives the member the option to allow other members to make contact via email, telephone or video conferencing. All communications through the system are completely anonymous in that the searcher is never provided the member's actual email address or phone numbers. Each member can choose to block access to his or her personal information by other members based on selection criteria and can likewise block access to the member's email, phone or video conferencing service.

5 Claims, 5 Drawing Sheets

Please fill in the following Information about yourself.

Sexual Preference:   Man Seeking Man, Man Seeking Woman, Woman Seeking Woman, Woman seeking Man, Other (Confidential) First Name: _____
(Confidential) Last Name: _____

Email Address: _____
(Confidential) Mothers Maiden Name: _____ for verification

Country You Live In: _____

(Confidential) Address: _____
City: _____
State: _____
Zip Code: _____

Birth Date: _____

Weight: _____
Height: _____

Eye Color:   Blue, Brown, Green, Hazel, Grey
Hair Color:  Black, Brown, Blond, Red, Bald, Ever Changing
Hair Type:   Short, Medium, Long, Curly, Straight Heritage / Ethnic Background:   Black, Asian, Native American, Caucasian, Hispanic / Latin, Pacific Islander, East Indian, Middle Eastern, Other Marital Status:   Single, Married, Separated, Divorced, Involved but Looking Highest Educational Level:   High School, College, Grad School, Post-Grad <u>Life Styles:</u>
Butts:   Smoker, Non-Smoker
Drugs:   Never, Occasionally, More than Occasionally
Booze:   None, Socially, Everyday, Barfly Religion:   Agnostic / Atheist, Buddhist, Catholic, Hindu, Jewish, Muslim, Protestant, Episcopalian, Baptist, Methodist, Christian, Other

Fig. 1A

*Write a little about what you want in a partner:* ____

_____
_____
_____
_____

Write a little about yourself: _____

_____
_____
_____

Allow ad to be viewed by non-members: (If rejected, TDS will send email letting the person know that member does not accept messages from non-members)

Allow general email messages: (Email from persons who do not have a profile to check against your preferences or are non-members.)

Allow contact from members who fit my profile only:
(If rejected, TDS will send a return message accordingly)

On return email, show my direct email address:
(Allows for direct email contact without going through the TDS system)

If allowing calls, enter numbers and times associated with each number: (max 3 numbers)
Number: _____  Times: _____
Number: _____  Times: _____
Number: _____  Times: _____

Include a Picture: (3 Max)
Include a Video: (1 Minute max)
Include an Audio Clip: (1 Minute max)

Once a member is contacted, the following options will be available:
Click "Yes" to:

Hide your profile from this member and disallow further contact:
Allow Phone Calls from this member:
Allow Video Conferencing from this member:

Other related options relating to Member Account Management:

Keep my ad hidden from the following email addresses or members:

_____
_____
_____

(A member can see and change the list of members who cannot access their profile.)

Keep my ad hidden from everyone BUT the following email addresses or members:

_____
_____
_____

(A member can hide their ad from everyone but certain people the want to hear from.)

Fig. 1B

Setup your profile for the partner you want to meet:

Geographic Area:
(List of areas here, broken down by: Country, Geographic Regions, State, City)

Age Parameters:     Older Then: ___     Younger Than: _____

Weight:     More Than: _____     Less Than: _____
Height:     Taller Than: _____     Shorter Than: _____

Eye Color:   Blue, Brown, Green, Hazel, Grey, No Preference
Hair Color:  Black, Brown, Blond, Red, Bald, No Preference
Hair Type:   Short, Medium, Long, Curly, Straight, No Preference

Heritage / Ethnic Background of person you are looking:
Black, Asian, Native American, Caucasian, Hispanic / Latin, Pacific Islander, East Indian, Middle Eastern, Other, No Preference

Marital Status of person you are looking:
Single, Married, Separated, Divorced, Involved but Looking, No Preference

Highest Educational Level of the person you are looking:
High School, College, Grad School, Post-Grad, No Preference <u>Life Styles:</u>
Butts:      Smoker, Non-Smoker, No Preference
Drugs:      Never, Occasionally, More than Occasionally, No Preference
Booze:      None, Socially, Everyday, Barfly, No Preference
Children:   Has Children          Has NO children Religion:   Agnostic / Atheist, Buddhist, Catholic, Hindu, Jewish, Muslim, Protestant, Episcopalian, Baptist, Methodist, Christian, Other, No Preference View members with photos only: Y / N

Fig. 1C

ANONYMOUS INTERACTIVE INTERNET-BASED DATING SERVICE

RELATED APPLICATION

This application claims priority from provisional application Ser. No. 60/169,965 filed Dec. 9, 1999.

BACKGROUND OF THE INVENTION

1. Field of the Invention

The present invention relates generally to the field of communications. More particularly the invention comprises a method and system for anonymously establishing communications between two individuals, such as subscribers to a dating service.

2. Prior Art

As is well known, many people today are using data services to help find their significant other. For years, these people have been making videos and sending them to services to be looked at by other people interested in finding their match. With the introduction of the Internet into the household, many of these dating services have turned to the Internet for their clientele. There are quite a few of these Internet dating services, but they lack the true aspect of getting to know someone: talking to the person. The current sites allow a client to review personal information about other clients or look at pictures, but a person cannot get the real sense of another's personality without speaking to the other person.

Many people who subscribe to a dating service would like to speak with the person they are interested in, but they do not want the person to know where they live or their telephone number until they are sure the person is safe. This is a major security issue. An anonymous interactive telephone system has been proposed for establishing a telephone connection between two individuals without divulging the identity or telephone number of either unless voluntarily revealed. Such system is disclosed in U.S. Pat. Nos. 4,847,890; 4,878,239; 5,058,152; 5,361,295; 5,623,536; 5,768,348 and 5,809,114, all of which are co-owned by The Telephone Connection. While the system disclosed in these patents preserves anonymity, it does not offer a subscriber the option of blocking access to the subscriber's personal information or to the subscriber's telephone.

SUMMARY OF THE INVENTION

The present invention provides an anonymous interactive Internet-based dating service allowing people to anonymously interact via Internet browsers, telephone communications and/or video conferencing. The system employs an interactive web site allowing a person to seek another person who may be compatible for a relationship. The system allows a member to post an ad describing themselves. The member can also post pictures, video clips or sound clips to go with his or her profile. The system then asks the member for an email address, which is used to forward email from interested parties. Upon verifying the email address, the system assigns the member a unique membership number and password. This is used for all further contact with the system's central computer. The system also gives the member the option to allow other members to make contact via telephone or video conferencing. If the member enables this option, the member is asked for a series of times he or she wants associated to each number. All communications through the system are completely anonymous in that the searcher is never provided the member's actual email address or phone numbers. Each member can choose to block access to his or her personal information by other members based on selection criteria and can likewise block access to the member's email, phone or video conferencing service.

BRIEF DESCRIPTION OF THE DRAWINGS

FIGS. 1a–1c illustrate a personal information questionnaire that may be utilized with the present invention.

DETAILED DESCRIPTION OF THE INVENTION

Figure 2A:
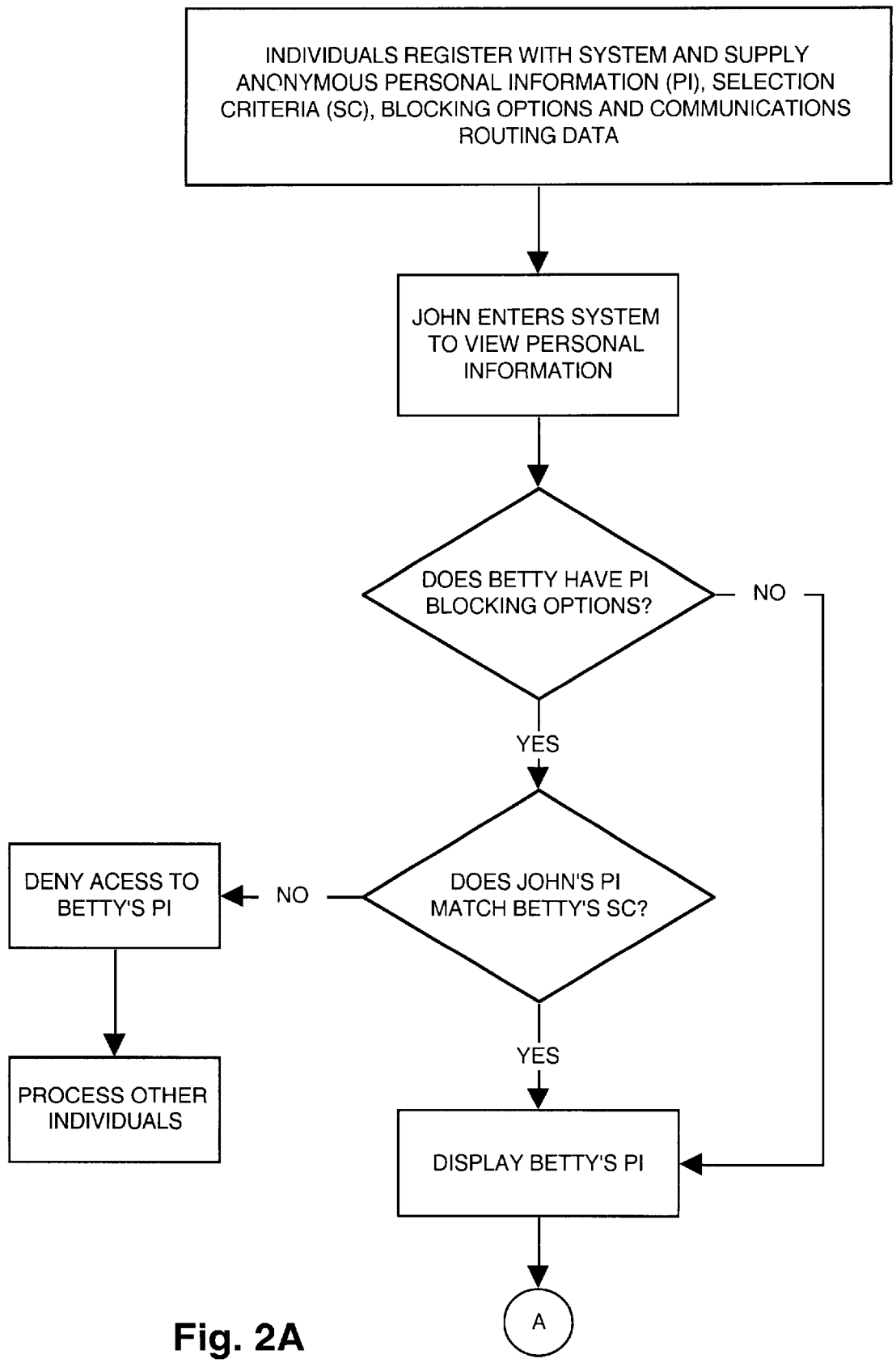
FIGS. 2a–2b are functional flow diagrams illustrating the method steps of the present invention for establishing a communications connection between two individuals.

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

The present invention is preferably implemented as an interactive site on the World Wide Web. However, this is not a limitation of the invention, and the system may be implemented in other ways. For example, prospective members may submit personal information questionnaires by mail and may also receive ads of other members by mail. In the preferred embodiment, however, a prospective member enters the system web site and indicates a desire to join, such as by clicking a box labeled "Join Now". The prospective member is then presented with a questionnaire, such as illustrated in FIGS. 1a–1c. The prospective member provides personal information about himself or herself which is maintained anonymously within the system. The prospective member is required to provide a valid email address, which is used for security purposes. Next, the member may opt to enter descriptive information about what kind of person he or she is looking to meet and opt to have the system send email from time to time anonymously listing other members who meet his or her personal criteria.

A unique feature offered by the system allows a member to block any email or other contact from persons who do not meet his/her personal preference criteria. For example, if the member wants someone taller than 6 feet, the system will not forward any email from a member who is under the 6 foot requirement. Instead, the system will send a note back to the sender indicating that the member had blocked email due to a preference parameter. This saves the searcher time and prevents the member for receiving unwanted email. As an additional feature, if a searcher is searching the database of members the system may check to see if the searcher matches the profile requirements of the persons in this list before the system returns a list of names. If the searcher does not meet the member's profile, those members will not show up in the list of names the searcher receives. All of these options are set by each individual member during initial setup, but can be changed at any time.

The prospective member provides communications routing data, in addition to an email address, for optional telephone and/or video-conferencing connections. Data may be provided for multiple numbers with the appropriate times of day during which the individual can be reached at those numbers. When the questionnaire is completed, it is submitted to the system for acceptance. Upon acceptance, the new member is issued a membership number and is requested to provide a password for accessing the system in the future. The new member's personal information is then posted as an "ad" for viewing by other members.

Figure 2B:
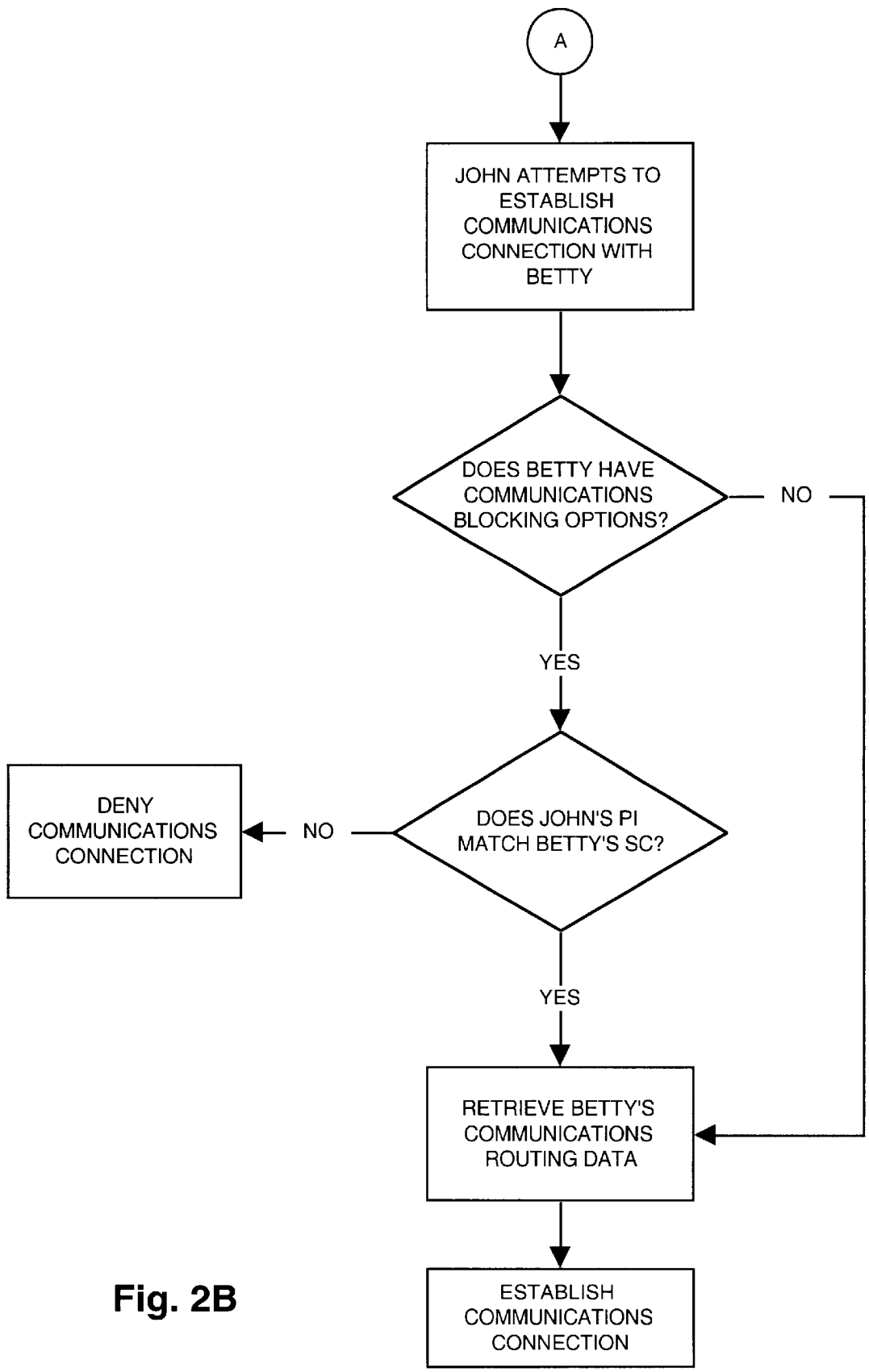

With reference to FIGS. 2a–2b, the procedure for establishing a communications connection with the present invention will be explained with an illustrative example. In searching the system, John finds an ad placed by Betty. John may send Betty an email message through the system letting her know that he is interested. Betty may then go look at John's ad and, if she is interested, she can send an email back letting him know she is interested. If Betty does not like John, she can select a blocking option in the system to keep him from making further contact. The blocking option may restrict John from seeing her ad at all or may simply block all further contact and send a message accordingly. If she is interested in John, she can continue the contact through standard email. If she wants to go further, she can select another option giving John the right to phone her. Again, this is all routed through the system, keeping everything anonymous. Betty can select the times and numbers the system will use when John calls. For example, if she wants the calls to be routed to work between the times of 8 a.m. and 6 p.m. and then routed to her cell phone from 6 p.m. to 7:30 p.m. and then to her house from 7:30 p.m. to midnight, she can set the options this way. She can even route all calls to an answering service, which is also provided by the system. If Betty has access to a videophone, she can optionally use this for video conferencing (also offered in a secure connection) instead of a simple phone communication. Internet video may also be made available to subscribers who want it. At any time, Betty can stop all communication with John or vice versa with a simple click of a mouse.

It will be recognized that the above-described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A method for anonymously establishing a communications connection between two individuals comprising:

registering a first individual with a central server, said first individual supplying anonymous personal information that is stored in the central server;

registering a second individual with the central server, said second individual supplying anonymous personal information, blocking options and communications routing data that is stored in the central server;

the first individual reviewing the anonymous personal information of the second individual and attempting to establish a communications connection with the second individual;

the central server comparing the anonymous personal information of the first individual with the blocking options of the second individual and denying a communications connection if there is a blocking match, otherwise establishing a communications connection in accordance with the communications routing data of the second individual;

wherein the second individual's communications routing data is not revealed to the first individual.

2. The method of claim 1 further comprising, before the first individual reviewing the anonymous personal information of the second individual, permitting the first individual to access the anonymous personal information of the second individual only if the anonymous personal information of the first individual matches selection criteria specified in the anonymous personal information of the second individual.

3. The method of claim 1 wherein the communications connection comprises a telephone connection.

4. The method of claim 1 wherein the communications connection comprises an electronic mail connection.

5. The method of claim 1 wherein the communications connection comprises a video conferencing connection.

* * * * *